US008447835B2

(12) United States Patent
Aaltonen et al.

(10) Patent No.: US 8,447,835 B2
(45) Date of Patent: May 21, 2013

(54) METHOD AND APPARATUS FOR ACCESSING DATA

(75) Inventors: Janne Aaltonen, Turku (FI); Juha Salo, Littoinen (FI); Rod Walsh, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/685,497

(22) Filed: Jan. 11, 2010

(65) Prior Publication Data

US 2010/0115054 A1 May 6, 2010

Related U.S. Application Data

(63) Continuation of application No. 10/074,238, filed on Feb. 14, 2002, now abandoned.

(51) Int. Cl.
*G06F 15/16* (2006.01)
*H04N 7/20* (2006.01)
*H04N 7/16* (2011.01)

(52) U.S. Cl.
USPC .................... 709/218; 725/62; 725/63

(58) Field of Classification Search
USPC ............................ 709/218; 725/62, 63
See application file for complete search history.

(56) References Cited

U.S. PATENT DOCUMENTS

| 5,610,916 | A | | 3/1997 | Kostreski et al. | |
|---|---|---|---|---|---|
| 5,890,172 | A | | 3/1999 | Borman et al. | |
| 6,105,060 | A | * | 8/2000 | Rothblatt | 709/219 |
| 6,108,706 | A | | 8/2000 | Birdwell et al. | |
| 6,119,101 | A | * | 9/2000 | Peckover | 705/26 |
| 6,226,655 | B1 | | 5/2001 | Borman et al. | |
| 6,385,647 | B1 | | 5/2002 | Willis et al. | |
| 6,393,745 | B1 | * | 5/2002 | Miki | 40/586 |
| 6,505,236 | B1 | * | 1/2003 | Pollack | 709/206 |
| 6,574,338 | B1 | * | 6/2003 | Sachdev | 380/212 |
| 6,606,745 | B2 | | 8/2003 | Maggio | |
| 6,618,585 | B1 | | 9/2003 | Robinson | |
| 6,628,625 | B1 | * | 9/2003 | Birdwell et al. | 370/270 |
| 6,738,981 | B1 | | 5/2004 | Tonnby et al. | |
| 6,741,841 | B1 | * | 5/2004 | Mitchell | 455/188.1 |
| 6,763,236 | B2 | | 7/2004 | Siren | |
| 2001/0014868 | A1 | * | 8/2001 | Herz et al. | 705/14 |
| 2002/0076051 | A1 | | 6/2002 | Nii | |
| 2009/0254971 | A1 | * | 10/2009 | Herz et al. | 726/1 |

FOREIGN PATENT DOCUMENTS

| EP | 0810520 A | 12/1997 |
|---|---|---|
| EP | 0868063 A | 9/1998 |
| JP | 11265397 A | 9/1999 |
| WO | 9856188 A2 | 12/1998 |

OTHER PUBLICATIONS

European Search Report completed Jan. 29, 2003 for European Application No. EP 02 25 1013.
Tarumi, H., et al., "SpaceTag: An Overlaid Virtual System and its Applications," Multimedia Computing and Systems, IEEE Comput. Soc, US, Jun. 7, 1999, pp. 207-212.

(Continued)

*Primary Examiner* — Asghar Bilgrami
(74) *Attorney, Agent, or Firm* — Ditthavong Mori & Steiner, P.C.

(57) ABSTRACT

The present invention relates to accessing data on computer networks, and more particularly to accessing such data via remote terminals. The present invention provides that unsolicited information is received via a first communications network on a communications device. Based on that information, the user can request further information via a second communications network.

20 Claims, 2 Drawing Sheets

OTHER PUBLICATIONS

Hartwig, S., et al., "Mobile Multimedia—Challenges and Opportunities Invited Paper," IEEE Transactions on Consumer Electronics, No. 4, Nov. 2000, pp. 1167-1178.

Ternullo, N.J., et al., "InfoFlo: A Novel Communication Infrastructure for Personal Digital Assistants," IEEE US, Oct. 8, 2000, pp. 448-453.

Clausen, H.D., et al., "Internet over Direct Broadcast Satellites," IEEE Communications Magazine, vol. 37, No. 6, Jun. 1999, pp. 146-151.

The Complete Idiot's Guide to Networking, Second Edition, Bill Wagner, 1999, Que Corporation, pp. 269-281.

* cited by examiner

METHOD AND APPARATUS FOR ACCESSING DATA

CROSS REFERENCE TO RELATED APPLICATION

This application is continuation of and claims the benefit of priority from co-pending U.S. application Ser. No. 10/074,238, entitled "METHOD AND APPARATUS FOR ACCESSING DATA," filed on Feb. 14, 2002, the content of which is incorporated herein by reference.

BACKGROUND OF THE INVENTION

The present invention relates to accessing data on computer networks, and more particularly to accessing such data via remote terminals.

Browsing the Internet and private Intranets via both personal computers and mobile telephones is common place. Typically, a user browses the Internet by connecting, via a telecommunications network to an Internet service provider (ISP). The ISP provides connection to the Internet, which allows the user to request data (for example, when an address or a hyperlink is followed), and allows the user to send data to an Internet site (for example, sending credit card details, personal preferences etc). Connection to an ISP is usually made through a telecommunications link which remains open whilst the user is browsing the Internet. The telecommunications link remains open even when the user is not actually sending or receiving data. For example, after a user has received a specific page from an Internet site, the connection is maintained even though the user may be reading that page. The connection is only terminated by the user at the end of a browsing session. Whilst the connection is maintained, a user is typically charged for the communications. Charges are typically levied either according to the length of time the telecommunications link remains open, or on the amount of data downloaded via the telecommunications network.

Browsing Internet sites consumes a large amount of bandwidth, since many Internet pages contain large amounts of high quality graphics and textual data. With personal computers, the bandwidth-hungry nature of browsing the Internet does not pose too much of a problem, since high speed modems and terminal adapters, such as ISDN, are readily and cheaply available. However, the bandwidth available to mobile users via Internet-enabled mobile phones and the like, using for example the GSM standard, is much more limited.

The arrival of the so-called third generation mobile phones will bring improvements in the available bandwidth, however the bandwidth will still be limited compared to that available for personal computer users.

Accordingly, one aim of the present invention is to improve browsing on mobile terminals.

SUMMARY OF THE INVENTION

According to a first aspect of the present invention, there is provided a method of accessing information on a computer network on a communication device, the device being capable of communicating with a first communications network and receiving a signal from a second communications network, the method comprising: receiving, via the second network, unsolicited information from the computer network, wherein the information contains an identifier identifying further information on the computer network; requesting, via the first network, further information from the computer network, wherein the further information is based on the received identifier; and receiving the further information via one of the first or second networks.

According to a second aspect of the present invention, there is provided a communication device for accessing information on a computer network, the device capable of communicating with a first communications network and receiving a signal from a second communications network, the device comprising: a receiver for receiving, via the second network, unsolicited information from the computer network, wherein the information contains an identifier identifying further information on the computer network; a transceiver for requesting, via the first network, further information from the computer network, wherein the further information is based on the received identifier.

The present invention provides many advantages, both to the user and to the service provider.

In order to encourage a user to visit a particular Internet site, the Internet site owner, through co-operation with a network service provider, may broadcast an amount of Internet data to many users. The Internet data may represent a so-called 'home page', be a number of Internet pages from an Internet site, or be a summary or site map of an Internet site. Those skilled in the art will appreciate that other alternatives are also possible. By broadcasting such data many users may be reached in a cost-effective way.

A user, upon receiving the broadcast data may freely browse the received data and can then decide whether he wishes to go on-line to browse the actual Internet site.

The user also benefits from this arrangement, since he may receive free data which he may browse at his leisure. If the data is of no interest, he simply ignores it. If the data is of interest, the user may quickly access the Internet site. Only when the user goes on-line is he charged for accessing the information.

The Internet site owner may also benefit due to a higher number of users accessing his site, therefore increasing sales or advertising revenue. The network provider may also benefit due to the increased number of calls being made to access the Internet.

BRIEF DESCRIPTION OF THE DRAWINGS

The invention will now be described, by way of example, with reference to the accompanying drawings, in which.

DETAILED DESCRIPTION OF THE INVENTION

Figure 1:
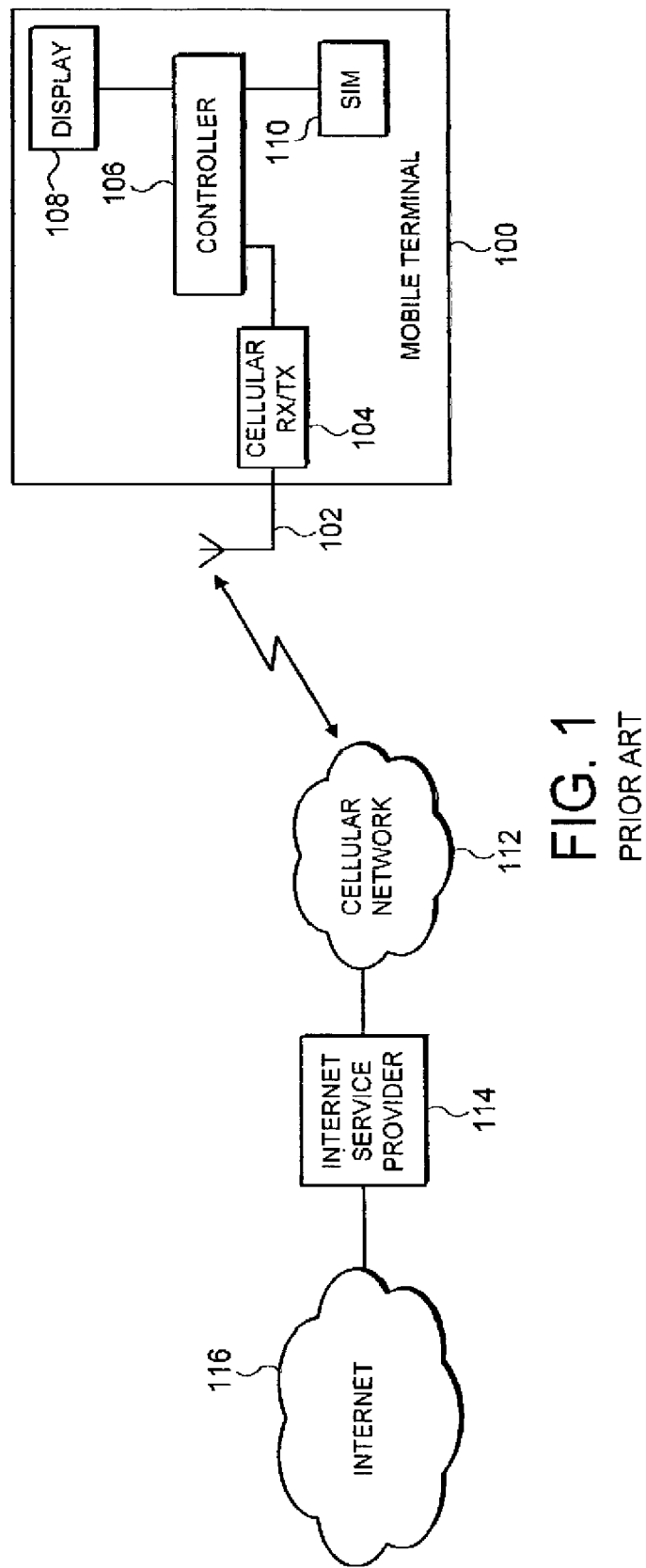
FIG. 1 is a block diagram showing how a mobile terminal 100 is connected to a computer network 116, such as the Internet, according to the prior art.

FIG. 1 is a block diagram showing how a mobile terminal 100 is connected to computer network 116, such as the Internet, according to the prior art.

The mobile terminal 100 comprises an antenna 102 for transmitting signals to and receiving signals from a cellular network 112. The mobile terminal 100 comprises a transmitter/receiver module 104, which controls the transmission and reception of data via the antenna 102. A controller 106 controls the function of the mobile terminal 100 to enable the mobile terminal to make and receive telephone calls, as well as to provide the functions required to enable the mobile terminal to be used for browsing the Internet 116. The mobile terminal 100 also comprises a display module 108, connected to the controller 106 for displaying information from the Internet or the cellular network to a user. A subscriber identification module (SIM) 110 is connected to the controller 106 to allow authentication of the user and other security functions which are well understood in the art.

In order to browse the Internet 116, the mobile terminal 100 must first make a point-to-point connection with a service provider 114, via the cellular network 112. The Internet service provider (ISP) 114 is connected to the Internet and acts to transmit data to and receive data from the mobile terminal 100 thereby allowing the mobile terminal to browse the Internet. Whilst browsing is taking place, the connection between the mobile terminal 100 and the Internet service provider 114 must be maintained until the browsing session is terminated. Typically, charges are levied by the cellular network for making the connection between the mobile terminal 100 and the service provider.

Browsing the Internet can be costly due to above-mentioned charges. Moreover, browsing the Internet can be slow, due to bandwidth restrictions. This can be particularly frustrating if a user of a mobile terminal knows the location of the page of information in the Internet he wishes to browse, but in order to get to that page has to navigate from a home page through several sub-pages.

Figure 2:
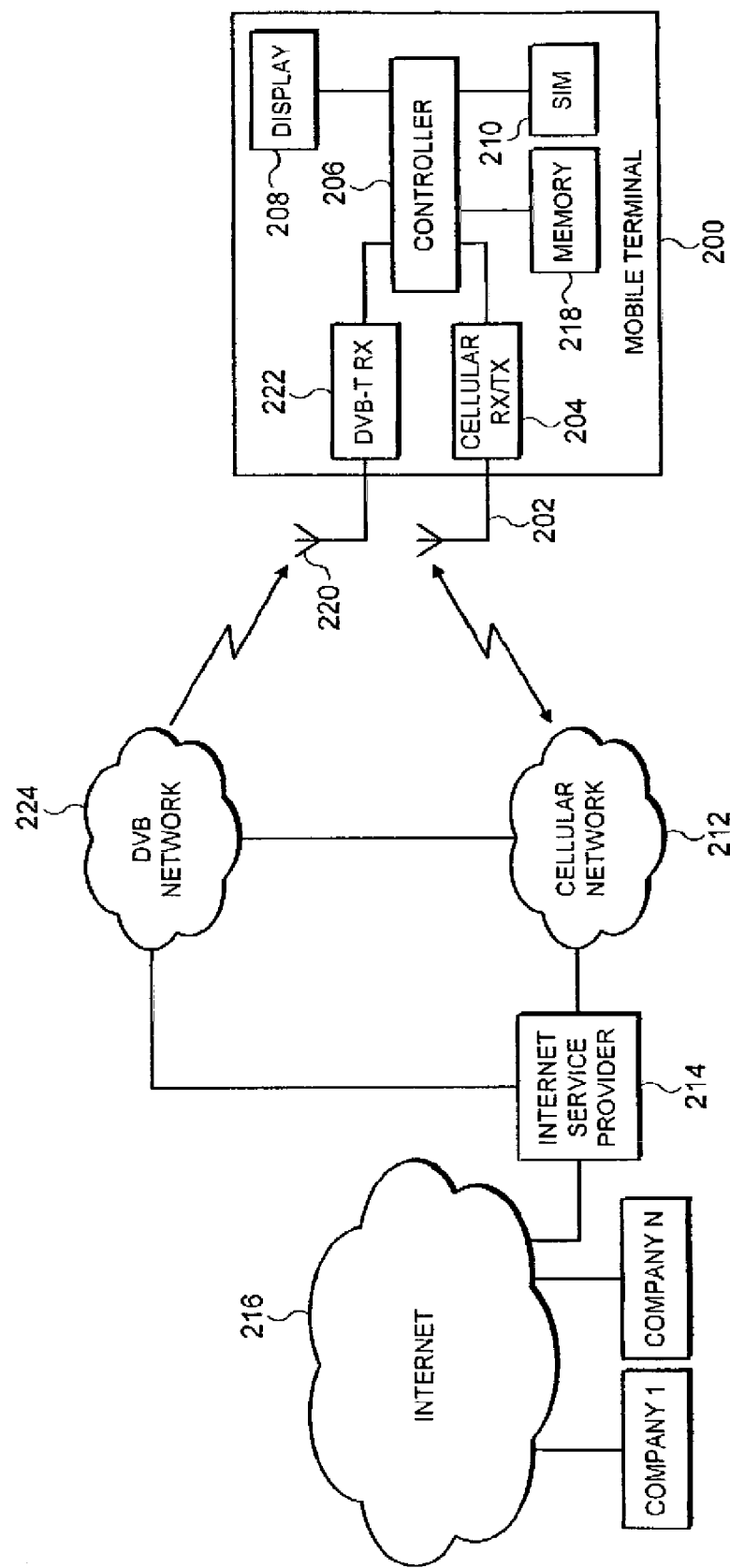
FIG. 2 is a block diagram showing a system according to a first embodiment of the present invention.

FIG. 2 is a block diagram showing a system according to a first embodiment according to the present invention.

A mobile terminal 200 comprises an antenna 202 for transmitting signals to and receiving signals from a cellular network 212. Those skilled in the art will appreciate that other telecommunications networks could be used in place of the cellular network without detracting from the inventive concepts described herein. Such cellular networks include, but are not limited to, GSM, EDGE, GPRS, and UMTS. Other such networks include fixed line telecommunications networks. The mobile terminal 200 comprises a transmitter/receiver (transceiver) module 204, which controls the transmission and reception of data via the antenna 202. A controller 206 controls the function of the mobile terminal 200 to enable the mobile terminal to be able to make and receive telephone calls, as well as to provide the functions required to enable the mobile terminal to be used for browsing the Internet 216. The mobile terminal 200 also comprises a display module 208, connected to the controller 206 for displaying information from the Internet to a user. A subscriber identification module (SIM) 210 is connected to the controller 206 to allow authentication of the user and other security functions, as will be apparent to those skilled in the art. The mobile terminal 200 further comprises a second antenna 220 for receiving signals from a terrestrial digital video broadcasting (DVB-T) network 224. Those skilled in the art will appreciate that other forms of broadcast network would also be suitable, such as a DVB satellite system. A DVB-T receiver 222 is connected to the antenna 220 for receiving and decoding DVB-T signals. The DVB-T receiver is also connected to the controller 206, whereby data received from the DVB-T network can be displayed via the display 208. A memory unit 218 is also connected to the controller 206 to allow storage of information received from either the DVB or the cellular network.

The mobile terminal 200 may browse the Internet 216 in the manner described above with reference to FIG. 1, by connecting to an Internet service provider (ISP) 214 via a cellular telecommunications network 212.

The mobile terminal 200 may also receive Internet data broadcast via the DVB-T network 224. The user may browse the received Internet data and decide whether to make a connection to the Internet, via the cellular network, based on the received Internet data. The received Internet data may contain a so-called hyperlink, universal resource locator (URL) or other information which indicates the location of further information on a remote computer.

In a first embodiment, the connection to the Internet is established via the cellular network, for example as described above with reference to FIG. 1. Requests for further information from the Internet are requested by the mobile terminal 200 via the cellular network 212. The requested information is sent to the mobile terminal also via the cellular network 212.

In a second embodiment, requests for further information are made by the mobile terminal via the cellular network, but the requested information is sent to the mobile terminal via the broadcast network. In certain situations it may be more economic to use the broadcast network for the transmission of data to the mobile terminal.

In this way, the initial data received via the broadcast network is used as a trigger to encourage a user to go on-line.

For example, a company may have an Internet site providing details of the company and a range of products or services on offer. In order to encourage users to access their Internet site the company, through co-operation with the DVB network 224 operator, may arrange to have some Internet data broadcast via the DVB network 224 to mobile terminals, such as 200. The Internet data broadcast may be the so-called home page of the Internet site, may be a summary of the Internet site, or even a site map of the Internet site with links allowing each section of the Internet site to accessed directly.

The broadcast of the Internet data is preferably unsolicited and may be directed towards all mobile terminals, or may be specifically targeted to individual or groups of mobile terminals according to a database of user profiles. The database of user profiles may be used to identity users to whom data is to be sent, which may be via point-to-point, multicast or broadcast transmissions. In this way, the Internet data may be transmitted to those users most likely to be interested in the Internet site of the company.

By being unsolicited data, the user does not have to actively do anything to receive the data, as any unsolicited data is received automatically.

The unsolicited information may optionally contain a content identifier, which identifies the subject matter of the information. Additionally, each mobile terminal may be configured with a user defined filter to filter out unsolicited information having a content identifier not defined by the user. For example, a user may define a set of subjects of interest, such as sport, leisure, finance, etc., and the mobile terminal will therefore filter out any unsolicited information which does not conform to the user preferences.

Given the high bandwidth of the DVB network the broadcast Internet data may be broadcast in a very quick and very cost-effective manner.

Once users have received the broadcast Internet data they may browse the data at will, free of charge. The data may be ignored or deleted if desired by the user. Alternatively, the user can decide to go on-line to access the full Internet site. In this way, the user only incurs charges when he has decided to go on-line.

Those skilled in the art will appreciate that, although the present invention is described with reference to the Internet, connections to other world-wide computer networks is also possible, as well as connection to private computer networks, such as corporate intranets etc. Additionally, reference to broadcast networks refers to any type of network which can provide the transport of multicast or broadcast data. Those skilled in the art will further appreciate that reference to mobile terminal is not limited to portable communication devices, and the present invention may suitably be implemented in fixed or homebased devices.

What is claimed is:

1. A method comprising:
receiving, at a communication device, via a first network, unsolicited information specifying an identifier of a website originating the unsolicited information, the communication device being targeted for receiving the unsolicited information based upon a user profile associated with the communication device, wherein the first network is a unidirectional network;
requesting, from the communication device, via a second network different from the first network, further information corresponding to the website; and
receiving, at the communication device, the further information via the second network in response to the requesting,
wherein an operator of the first network does not charge the communication device a communication connection fee for receiving the unsolicited information, and an operator of the second network operator charges the communication device a communication connection fee for receiving the further information.

2. The method of claim 1, wherein the first network is a broadcast network, and wherein receiving via the first network includes receiving via the broadcast network.

3. The method of claim 2, wherein the second network is a telecommunications network, and wherein receiving the further information includes receiving the further information via the telecommunications network.

4. The method of claim 1, wherein the second network is a bi-directional telecommunications network.

5. The method of claim 1, wherein the unsolicited information includes a content identifier, and the method further comprises storing, on the communication device, a list of content identifiers of interest.

6. The method of claim 5, further comprising filtering the received unsolicited information to remove any information not having a content identifier in the list of content identifiers.

7. The method of claim 1, wherein the first network is a digital video broadcast terrestrial (DVB-T) network, and wherein receiving via the first network includes receiving via the DVB-T network.

8. An apparatus comprising:
at least one processor; and
at least one memory including computer program code for one or more programs,
the at least one memory and the computer program code configured to, with the at least one processor, cause the apparatus to perform at least the following,
receive, via a first network, unsolicited information specifying an identifier of a website originating the unsolicited information, wherein the apparatus is targeted for receiving the unsolicited information based upon a user profile associated with the apparatus, wherein the first network is a unidirectional network;
request, via a second network different from the first network, further information corresponding to the website; and
receive, via the second network, the further information in response to the requesting,
wherein an operator of the first network does not charge the communication device a communication connection fee for receiving the unsolicited information, and an operator of the second network operator charges the communication device a communication connection fee for receiving the further information.

9. The apparatus of claim 8, wherein the apparatus is further caused to receive the further information via the first network.

10. The apparatus of claim 8, wherein the first network is a broadcast network, and the apparatus is further caused to receive the unsolicited information via the broadcast network.

11. The apparatus of claim 8, wherein the second network is a bi-directional telecommunications network.

12. The apparatus of claim 8, wherein the unsolicited information includes a content identifier, and the apparatus is further caused to store a list of content identifiers of interest.

13. The apparatus of claim 12, wherein the apparatus is further caused to filter the received unsolicited information to remove information not having a content identifier in the list of content identifiers.

14. The apparatus of claim 8, wherein the first network is a digital video broadcast terrestrial (DVB-T) network.

15. The apparatus of claim 8, further comprising a portable communication device.

16. A non-transitory computer-readable storage medium carrying one or more sequences of one or more instructions which, when executed by one or more processors, cause an apparatus to at least perform the following steps:
receiving, via a first network, unsolicited information specifying an identifier of a website originating the unsolicited information, wherein the apparatus is targeted for receiving the unsolicited information based upon a user profile associated with the apparatus, wherein the first network is a unidirectional network;
requesting, via a second network different from the first network, further information corresponding to the website; and
receiving, via the second network, the further information in response to the requesting,
wherein an operator of the first network does not charge the communication device a communication connection fee for receiving the unsolicited information, and an operator of the second network operator charges the communication device a communication connection fee for receiving the further information.

17. The non-transitory computer-readable storage medium of claim 16, wherein the unidirectional broadcast network is configured according to Digital Video Broadcast (DVB) network standards.

18. The non-transitory computer-readable storage medium of claim 16, wherein the second network page includes a site map of the network site.

19. The non-transitory computer-readable storage medium of claim 16, wherein the apparatus is caused to further perform: filtering the received unsolicited information to remove any information not having a content identifier in a list of content identifiers stored on the apparatus.

20. The method of claim 1, wherein the unsolicited information includes a summary, a site map, or a combination thereof, of the website.

* * * * *